US009575877B2

(12) United States Patent
Ishigooka et al.

(10) Patent No.: US 9,575,877 B2
(45) Date of Patent: Feb. 21, 2017

(54) METHOD AND SYSTEM FOR TESTING CONTROL SOFTWARE OF A CONTROLLED SYSTEM

(71) Applicant: Hitachi, Ltd., Tokyo (JP)

(72) Inventors: Tasuku Ishigooka, Munich (DE); Fumio Narisawa, Tokyo (JP); Kohei Sakurai, Tokyo (JP); Neeraj Suri, Darmstadt (DE); Habib Saissi, Darmstadt (DE); Thorsten Piper, Darmstadt (DE); Stefan Winter, Darmstadt (DE)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/697,800

(22) Filed: Apr. 28, 2015

(65) Prior Publication Data

US 2015/0309920 A1 Oct. 29, 2015

(30) Foreign Application Priority Data

Apr. 29, 2014 (EP) ..................................... 14166398

(51) Int. Cl.
*G06F 9/44* (2006.01)
*G06F 11/36* (2006.01)
*G06F 17/50* (2006.01)

(52) U.S. Cl.
CPC ....... *G06F 11/3688* (2013.01); *G06F 11/3608* (2013.01); *G06F 17/5009* (2013.01); *G06F 2217/86* (2013.01)

(58) Field of Classification Search
None
See application file for complete search history.

(56) References Cited

U.S. PATENT DOCUMENTS 5,396,160 A * 3/1995 Chen ...................... B25J 9/1664
318/571
8,555,123 B2 * 10/2013 Wu ...................... G06F 11/2236
714/727

(Continued)

FOREIGN PATENT DOCUMENTS

JP 2009-014406 A 1/2009

OTHER PUBLICATIONS

Broy, M., et al.; "Cross-layer Analysis, Testing and Verification of Automotive Control Software"; Proceedings of the Ninth ACM International Conference on Embedded Software; Oct. 9-14, 2011, Taipei, Taiwan; pp. 263-272.

(Continued)

*Primary Examiner* — Evral E Bodden
(74) *Attorney, Agent, or Firm* — Foley & Lardner LLP

(57) ABSTRACT

A method for testing control software of a controlled system is disclosed. The method may involve providing control software code data for each of the one or more electronic control units. The method may further involve providing simulation code data for the controlled system. The method may further involve providing verification requirement information data that indicates one or more verification requirement conditions corresponding to a respective control error situation. The method may further involve creating a system model based on the provided simulation code data and the provided control software code data provided for each of the one or more electronic control units. The method may further involve creating an executable program based on the created system model and performing a software verification process on the basis of the executable program.

20 Claims, 14 Drawing Sheets

(56) References Cited

U.S. PATENT DOCUMENTS

| | | | |
|---|---|---|---|
| 8,692,995 B2* | 4/2014 | Barth | F41G 7/004 |
| | | | 250/214.1 |
| 2011/0295391 A1* | 12/2011 | Schneider | G06F 8/34 |
| | | | 700/87 |
| 2012/0290261 A1* | 11/2012 | Genta | G05B 23/00 |
| | | | 702/179 |

OTHER PUBLICATIONS

German Patent and Trademark Office action on application 10 2015 207 656.3 dated Dec. 12, 2015; 8 pages; with partial English translation (7 pages).

* cited by examiner

FIG. 4

```
...
void BCU_software_execution_1ms(){
  ...
  if(BCU_input_ESC_status==0){
    ...
    // oil leak detection
    ratio = BCU_input_pedal_stroke_value / \
            BCU_input_hydraulic_pressure;

if(ratio < 2){
      // normal
      BCU_output_brake_control_command = \
              software_input_pedal_sensor_value * 2;
    }else{
      // failsafe
      BCU_output_brake_control_command = 10;
    }
    ...
  }else{
    // not work
  }
  ...
}
...
```

```
502
    ...
    void ESC_software_execution_1ms(){
       ...
       if(car_sideslip_event==0){
          // not work
          ESC_output_ESC_status = 0;
       }else{
          ESC_output_ESC_status = 1;
          ESC_output_brake_control_command = 5;
       }
       ...
    }
    ...
```

```
...
void plant_update(){
  ...
  if(plant_input_valve_status=0){    // open
    ...
    if(driver_pedal_event == 1){
      plant_output_pedal_stroke_value = \
          tf_pedal_stroke_value(10);
    }else{
      plant_output_pedal_stroke_value = \
          tf_pedal_stroke_value(0);
    }
    ...
    plant_output_hydraulic_pressure = \
    tf_hydraulic_pressure(plant_input_BCU_brake_control_command);
    ...

brake_force = \
        tf_brake_force(plant_output_BCU_hydraulic_pressure);
    ...

}else{    // close
    ...
    plant_inside_ESC_hydraulic_pressure = \
    tf_hydraulic_pressure(plant_input_ESC_brake_control_command);
    ...
    brake_force = \
        tf_brake_force(plant_inside_ESC_hydraulic_pressure);
    ...
    plant_output_hydraulic_pressure -=
        plant_inside_ESC_hydraulic_pressure;    // absorb oil
    ...
  }
}
...
```

FIG. 7

```
504
    software to plant:

BCU_output_brake_control_command ->
            plant_input_BCU_brake_control_command;

ESC_output_brake_control_command ->
            plant_input_ESC_brake_control_command;

ESC_output_ESC_status ->
            plant_input_valve_status;

plant to software:

plant_output_BCU_hydraulic_pressure ->
            BCU_input_hydraulic_pressure;

plant_output_pedal_stroke_value ->
            BCU_input_pedal_stroke_value;

ECU to ECU:

ESC_output_ESC_status ->
            BCU_input_ESC_status;
```

FIG. 8

```
505
    system input 1:
    driver_pedal_event, 2000

System input 2:
    car_sideslip_event, 2000
```

FIG. 9

```
506
Verification Time:
5000ms condition:
pedal_event==0 && pedal_off_time>=500 && sideslipe_event==0 \
&& sideslipe_off_time>=500 && brake_force_increase > 0
```

```
void copy_software_to_plant(){
  plant_input_BCU_brake_control_command = \
          BCU_output_brake_control_command;
  plant_input_ESC_brake_control_command = \
          ESC_output_brake_control_command;
  plant_input_valve_status = \
          ESC_output_ESC_status;
} void copy_plant_to_software(){
  BCU_input_hydraulic_pressure = \
          plant_output_BCU_hydraulic_pressure;
  BCU_input_pedal_stroke_value = \
          plant_output_pedal_stroke_value;
} void copy_ECU_to_ECU(){
  BCU_input_ESC_status = ESC_output_ESC_status;
}
```

FIG. 11

```
void symbolic_module(){
  if(v_time % 2000 == 0){
    klee_make_symbolic \
    (&driver_pedal_event, sizeof(driver_pedal_event), "X");
    klee_make_symbolic \
    (&car_sideslip_event, sizeof(car_sideslip_event), "Y");
  }
}
```

FIG. 12

```
void assertion_module(){
  if(pedal_event==0 && pedal_off_time>=500 && sideslipe_event==0 \
     && sideslipe_off_time>=500 && brake_force_increase > 0){
    klee_assert(0);    // notice "system error"
  }
}
```

```
...
void main(){
  ...
  for(v_time=0; v_time < MAX; v_time++){
    symbolic_module();

plant_update();
    copy_plant_to_software();
    software_execution(v_time);
    copy_ECU_to_ECU();
    copy_software_to_plant();

// elapsed_time starts the count after
       brake_pedal_event changes from 1 to 0
    elapsed_time++;

assertion_module();
  }
  ...
}
...

...
void software_execution(unsigned long v_time){
  ...
  if(v_time%1==0)  BCU_software_execution_1ms();
  if(v_time%1==0)  ESC_software_execution_1ms();
  ...
}
...
```

METHOD AND SYSTEM FOR TESTING CONTROL SOFTWARE OF A CONTROLLED SYSTEM

CLAIM OF PRIORITY

The present application claims priority from European patent application EP14166398.9 filed on Apr. 29, 2014, the content of which is hereby incorporated by reference into this application.

BACKGROUND

Technical Field

The present invention relates to a method and a system for testing control software of a controlled system, the control led system comprising one or more electronic control units, one or more actuators, and one or more sensors, each sensor being adapted to input a respective sensor signal to at least one of the one or more electronic control units and each actuator being adapted to act responsive to respective control signals input from at least one of the electronic control units, and each electronic control unit being configured to execute a respective executable control program based on control software code data to output one or more control signals to the one or more actuators on the basis of input sensor signals.

Background Art

In controlled systems/plants, such as e.g. automotive control systems or embedded systems, there are provided one or more electronic control units for controlling actuators of the controlled, system/plant in accordance with out putting control commands that are calculated by the respective electronic control unit (ECU) based on control logic given by control software code data and current sensor values which, in automotive systems may indicate behavior of the automobile and/or the driver's actions. For example, some actuators may be controlled by electronic signals or by hydraulic pressure based on the ECU software controls. However, due to the increasing responsibilities of the electronic control units and increasing complexity of the controlled systems including multiple electronic control units and even multiple electronic control units sharing control over shared actuators, the demands on functionality are continuously increasing.

For verification and testing of control software, it is important to efficiently and reliably test control software of electronic control units of the controlled system/plant during development that are free of system bugs, especially in view of safety requirements. For example, JP 2009-014406 A describes a software testing process based on a so-called Hardware-In-The-Loop (HIL) approach in which a plant simulator is attached to an electronic control unit for testing the software of the electronic control unit. However, such approach focuses only on the control software behavior of the electronic control until but does not focus on testing the plant behavior so that some system bugs may be missed in the testing process. Also, in HIL approaches, it is difficult to test systems having more than one electronic control unit and system bugs occurring due to collaboration of multiple electronic control units may be missed.

In view of the above, it is an object of the present invention to provide a method and a system for testing control software of a controlled system that reliably and efficiently allows to find the system bugs in the controlled system, including system hugs that occur only in specific situations due to collaboration of multiple electronic control units and plant behavior.

SUMMARY

For solving the above object, according to embodiments of the present, invention, there is proposed a method for testing control software of a controlled system according to claim 1, a system for testing control software of a controlled system according to claim 14, and a computer program product according to claim 15. Dependent claims relate to preferred embodiments.

According to an aspect of embodiments, there may be provided a method for testing control software of a controlled system, the controlled system comprising one or more electronic control units, one or more actuators, and one or more sensors, each sensor being adapted to input a respective sensor signal to at least one of the one or more electronic control units and each actuator being adapted to act responsive to respective control signals input from at least one of the electronic control units, and each electronic control unit being configured to execute a respective executable control program based on control software code data to output one or more control signals to the one or more actuators on the basis of input sensor signals.

The method may comprise: providing control software code data for each of the one or more electronic control units, providing simulation code data for the controlled system, creating a system model based on the provided control software code data provided for each of the one or move electronic control units and the provided simulation code data, creating an executable program based on the created system model, and/or performing a software verification process on the basis of the executable program.

According to embodiments of the invention, it is an underlying idea to perform a software testing verification process on an executable program that is build based on a system model which includes the control software code data for each of the involved electronic control units of the controlled system as well as a simulation code data that is generated to numerically simulate the plant behavior, so that the verification process not only focuses on the control behavior of one electronic control unit at a time, but to take into account also effects that may occur due to collaboration of multiple electronic control units and behavior of the controlled system/plant. As an advantage thereof, embodiments of the present invention allow to efficiently and reliably find the related system bugs including the system bugs occurring only in specific situations due to collaboration of electronic control units and plant behavior, which could be missed in common control software verification techniques.

According to a preferred aspect, performing the software verification process on the basis of the executable program may comprise performing symbolic execution on the basis of the system model. Preferably, creating the executable program based on the created system model may comprise transferring one or more parameters of the system model into symbols for symbolic execution. This has the advantage that a variety of different situations may be efficiently and reliably tested based tin abstract path conditions for symbolic variables in contrast to actual input values.

According to another preferred aspect, the method may further comprise providing system input information data that indicates the one or more parameters of the system model to be transferred into symbols for symbolic execution. This has the advantage that the system input values to be transferred into symbols for symbolic execution may be selected and varied by user input for efficiently allowing multiple verification approaches.

Preferably, the system model comprises symbolic module code data defining a function for transferring parameters to symbols based on the provided system input information data.

According to another preferred aspect, the method may further comprise providing verification requirement information data that indicates one or more verification requirement conditions corresponding to a respective control error situation.

Preferably, performing the software verification process may comprise: iterating through an execution tree of the executable program according to one or more path conditions of the executable program, and/or checking, at each iteration, whether at least one of the one or more verification requirement conditions is fulfilled, and, in particular, preferably notifying a user about the detection of the control error situation in case it is determined that at least one of the one or more verification requirement conditions is fulfilled.

According to another preferred aspect, the method may further comprise outputting a specific path condition associated with the detected control error situation. This has the advantage that the underlying path conditions of the system input variables leading to the detected error may be detected and analyzed.

According to another preferred aspect, the method may further comprise providing collaboration information data that indicates associations of related input parameters and output parameters of the provided control, software code data and the provided simulation code data. This has the advantage that a system model can be defined that uses defined relationships of related input parameters and output parameters of the provided control software code data and the provided simulation code data.

Preferably, the system model comprises collaboration module code data indicating one or more functions of copying output parameters to associated input parameters based on the provided collaboration information data.

Preferably, the collaboration module code data indicates a first function of copying output parameters of control software code data of one or more electronic control units to associated input parameters of control software code data of one or more electronic control units, a second function of copying output parameters of control software code data, of one or more electronic control units to associated input parameters of the simulation code data, and/or a third function of copying output parameters of the simulation code data to associated input parameters of control software code data of one or more electronic control units.

According to another preferred aspect, the system model may comprise synchronization module code data indicating synchronization between execution of one or more functions of the control software code data for the one or more electronic control units and the simulation code data for the controlled system. This has the advantage that the system model can be efficiently and accurately provided considering a time behavior of the controlled plant and synchronization between control operations of one or even multiple simultaneously acting electronic control units and plant behavior.

Preferably, the synchronization module code data indicates an executable function which indicates an execution order and execution timing of executable functions of the control software code data for the one or more electronic control units and the simulation code data, in particular enabling different execution frequencies for functions of the control software code data compared to functions of the simulation code data.

According to another aspect, there may be provided, in accordance with one or more of the above aspects, a verification system for testing control software of the controlled system, the verification system comprising: a data providing unit configured to provide control software code data for each of the one or in ore electronic control units and to provide simulation code data for the controlled system, a system model constructor configured to create a system model based on the provided control software code data provided for each of the one or more electronic control units and the provided simulation code data, a compiler configured to create an executable program based on the created system model, and/or a verification unit configured to perform a software verification process on the basis of the executable program.

According to yet another aspect, there may be provided a computer program product comprising computer program means storable on a computer-readable medium and being executable by a computer device, the program means comprising executable instructions causing the computer device to perform steps of a method according to one or more of the above aspects.

BRIEF DESCRIPTION OF THE DRAWINGS

FIG. 4 exemplarily shows a part of control software code data of a brake control unit of FIG. 3A.

FIG. 5 exemplarily shows a part of control software code data of an electronic control unit for electronic stability control of FIG. 3A.

FIG. 6 exemplarily shows a part of plant, simulation code data of the controlled system of FIG. 3A.

FIG. 7 exemplarily shows collaboration information data for the controlled system of FIG. 3A.

FIG. 8 exemplarily shows system input information data for test purposes of the controlled system of FIG. 3A.

FIG. 9 exemplarily shows verification requirement information data.

FIG. 10 exemplarily shows a part of collaboration module code data based on the collaboration information data of FIG. 7.

FIG. 11 exemplarily shows a part of symbolic module code data based on the system input information data of FIG. 8.

FIG. 12 exemplarily shows a part of assertion module code data based on the verification requirement data of FIG. 9.

FIG. 13 exemplarily shows a part of synchronization module code data.

DETAILED DESCRIPTION OF THE EMBODIMENTS

Figure 1:
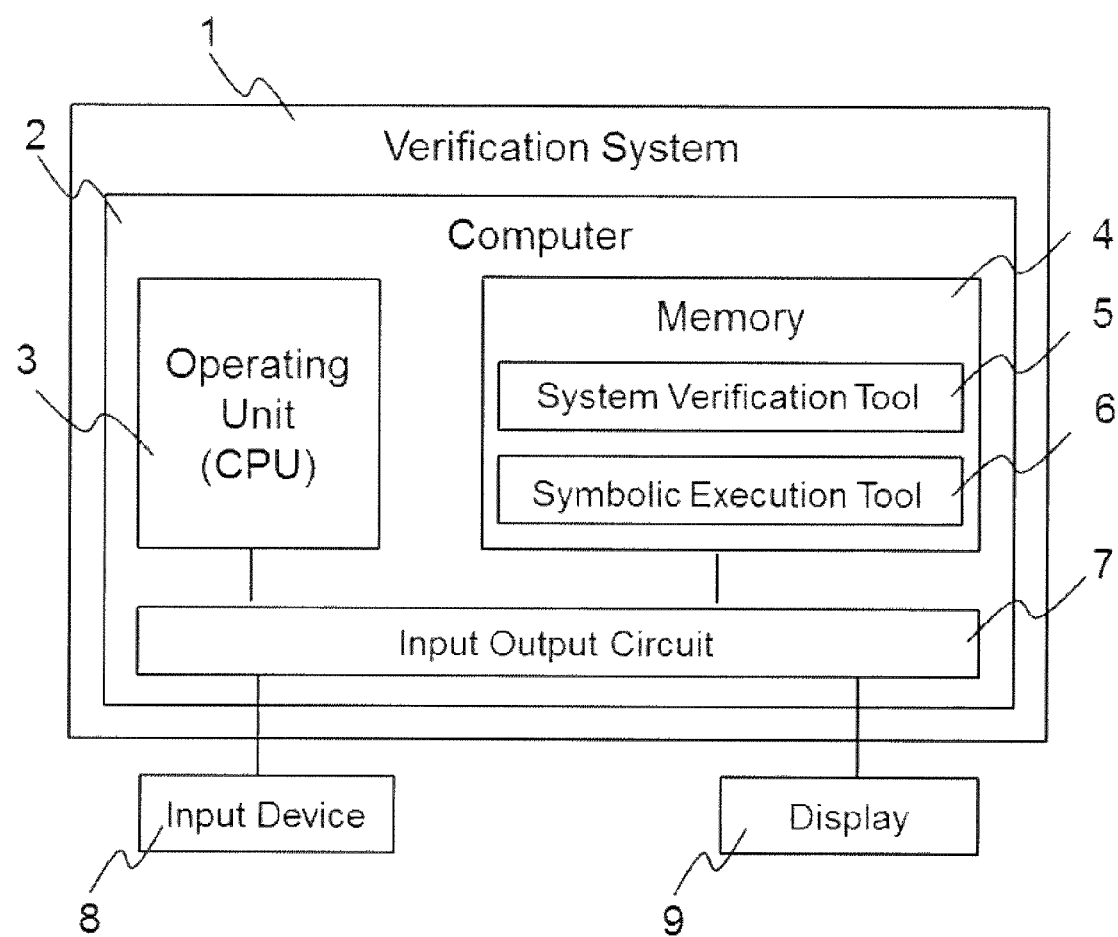
FIG. 1 exemplarily shows a schematic view of a verification system according to an embodiment.

Preferred embodiments of the present invention will be described below with reference to the accompanying figures. The described features and aspects of the embodiments may be modified or combined to form further embodiments of the present invention.

Cyber-Physical Systems (CPS) linking computing to physical systems are often used to monitor and control safety critical processes. i.e. processes that bear the potential to cause significant damage or loss in the case of failures. While safety-critical systems have been extensively studied in both the discrete (computing) and analog (control) domains, the developed techniques mostly apply to the specific discrete or analog domain. As cyber-physical systems span both these domain, the focus on an individual domain leaves a gap on the system level, where complex interactions between both domains can lead to failures that cannot be analyzed by considering only the physical or the digital part of the integrated CPS.

Cyber-Physical Systems (CPS) are seeing increasing usage in transportation, power and for other safety-critical systems. The CPS is used to monitor and control (analog) physical phenomenon through physical actuators which are, in turn, operated by (digital) safety critical computing system. The processing needs to correctly monitor the target system behavior and to accurately operate the actuators in order to guarantee the system's safety to avoid damage to either the system or to the operational environment.

Consequently, for safety critical CPS, rigorous verification technologies to ensure correct operations have been studied to consider both the discrete and continuous aspects. However, as these technologies typically only focus on an individual aspect, the complex interactions between discrete processing and continuous behavior has potential to cause complex system level bugs.

For example, an automotive brake control system contains the difficult-to-find safety-related bugs caused only by the specific combination of specific driver operation and specific vehicle behavior given a specific combination of sequence and timing. While the requirement for safety verification for critical CPS is easy to state ensuring coverage of all possible computing and control interactions is infeasible using conventional engineering approaches. These complicated control/computing interactions often result in timing and sequence bugs that are particularly hard to uncover. Additionally, as a design engineer often only has detailed knowledge of only his discrete control or computing domain, this issue gets very complex.

According to some embodiments, it is proposed to use a practical formal verification platform/system for safety critical CPS. The proposed verification system can find system level bugs by checking safety relevant property of system models, which simulate control system behavior by combining control software and plant source code, on the basis with symbolic execution based formal verification.

Main aspects of some embodiments may relate to the following: 1) construction of practical formal verification process for safety critical CPS, 2) development of a system model construction method for safety critical CPS, 3) clarification of symbol definition for system inputs of safety critical CPS, 4) clarification of property definition using assertion instruction for safety critical CPS, 5) establishment of system level bug detection through a case study on safety verification of an exemplary real automotive brake control system, and/or 6) construction of practical optimization process for safety critical CPS.

In some embodiments, it is proposed to make use of symbolic execution. Symbolic execution based formal verification helps users efficiently find input value cases causing errors of targeting source code. The reason is that the verification can investigate all possible effects caused by changes of the value in variables which users define as symbol from the view of branch conditions (path conditions). Consequently, if users define input variables of verification targets as symbol and insert branch instructions with conditions like negative property detecting errors as assertion code, the verification finds the input case causing the errors if the target does not satisfy its property.

Symbolic execution based formal verification analyzes program logic of the verification target and extracts formula effecting symbols. Then, the verification makes a constraint for respective branch in accordance with the formula. If the constraint involves multiple symbols, the verification makes a constraint by merging these formulas. Finally, the verification provides the constant value of symbols, which satisfies the constraint, using a solver aimed at solving constraints. Consequently, as the verification can inform the error test case if the program reaches the error path, it is the efficient verification technology to logically cover all possible behavior of verification target.

In some embodiments, a proposed process enables a verification of whole control system. In the process, a system model which simulates control system behavior build up by combining control software, plant code, safety requirement, and/or system information. And then, the system model behavior may be checked using symbolic system inputs in accordance with property detecting safety requirement violations. The plant code may correspond to the code with plant behavior logic which can, for example, be extracted from the plant code for HILS except for dependency code for the HILS device. Furthermore, it may be proposed a formal verification platform (as a verification system) for realization of the proposed verification process. Such verification system may automatically generate the system model from given control software, plant code for HILS, safety requirements, system information. The system information may involve system input, task execution period, and/or plant discretization time. Then, the system may conduct safety verification of the system model by symbolic execution based formal verification.

FIG. 1 exemplarily shows a schematic view of a verification system according to an embodiment. The verification system 1 comprises a computer 2 having an operating unit 3 (such as e.g. one or more CPUs) and a memory 4 which is configured to store data and programs to be executed by the operating unit 3, including an operating system program. The memory may include volatile memory and/or non-volatile memory, and it may comprise different memory units such as e.g. RAM, ROM, cache memory, hard disk storage and/or flash memory.

Exemplarily, the memory 4 stores a system verification tool 5 and a symbolic execution based verification tool 6 such as e.g. a symbolic execution based verification tool based on EXE, KLEE or CREST (cf. e.g. the article "Symbolic Execution for Software Testing: Three Decades Later" by C. Cadar and K. Sen).

Furthermore, the verification system 1 includes an input device 8 (such as a keyboard, keypad, mouse, touchpad, and/or touchscreen) for receiving user input and a display 9 for providing information on a visual screen to a user. The input device 8 and the display 9 are connected to the verification computer 2 by an input output unit 7 of the computer 2.

In this description, a distinction is made between two types of data: information data and code data. Information data is a type of data that indicates information such as parameters, input parameters and output parameters, values of parameters, relationships of parameters etc. The format of information data is not limited. Code data, on the other hand, is written as code in a programming language such as C, C++, PERL, Postscript, Java, Javascript or the like, and follows the rules of the respective programming language. Control data defines functions that rely on input parameters and give output parameters, e.g. based on defined calculations. By using a compiler, code data can be transformed into executable functions that can be executed by the operating unit 3.

Figure 2:
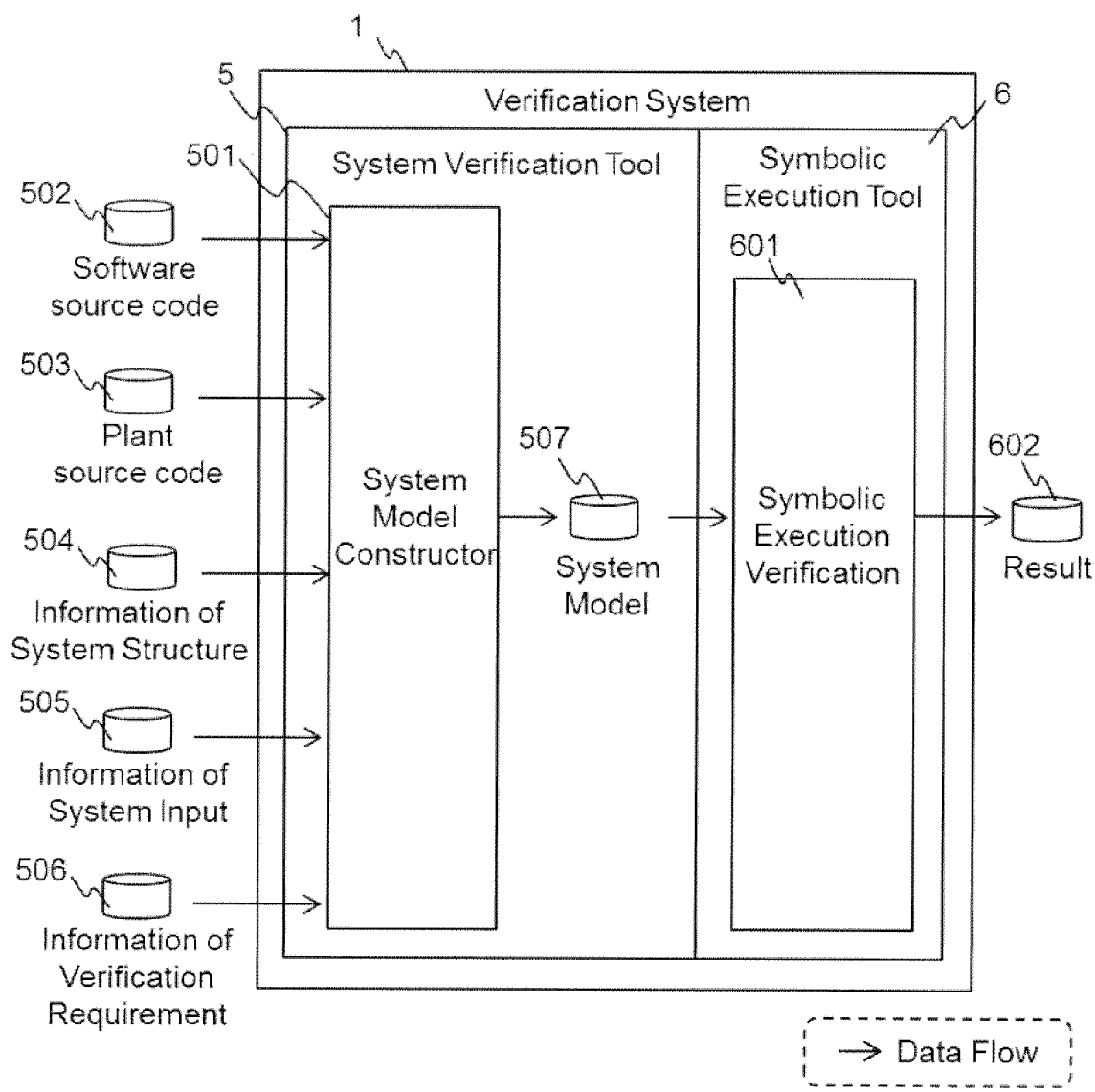
FIG. 2 exemplarily shows a data flow structure in a verification system according to FIG. 1.

FIG. 2 exemplarily shows a data flow structure in a verification system according to FIG. 1. As can be seen in FIG. 2, the following input data is exemplarily provided: control software code data 502 (e.g. software source code from one or more ECUs), plant simulation code data 503 (e.g. a plant source code generated by a code generator such as e.g. Simulink), collaboration Information data 504 (for indicating information of a system structure), system input information data 505 (for indicating information of a system input), and verification requirement information data 506 (for indicating information of one or more verification requirements) provided by a user.

The input data as mentioned above is input to a system model constructor 501 of the system verification tool 5, and the system model constructor 501 is adapted to generate a system model 507 based on the input data, specifically based on the control software code data 502, plant simulation code data 503, collaboration information data 504, system input information data 505, and verification requirement information data 506.

Then, the generated system model 507 is exemplarily input to the symbolic execution based verification tool 6 for symbolic execution based verification (e.g. based on a known symbolic execution based verification tool such as KLEE, EXE or CREST mentioned above), which then outputs the results 602 of the verification.

The above verification is exemplarily explained in connection with a brake control system of an automobile as controlled system in the following. It is to be noted, however, that the verification process is not limited to a brake control system but can be applied to various controlled systems/plants such as controlled systems comprising one or more electronic control units, one or more actuators, and one or more sensors, each sensor being adapted to input a respective sensor signal to at least one of the one or more electronic control units and each actuator being adapted to act responsive to respective control signals input from at least one of the electronic control units, and each electronic control unit being configured to execute a respective control program to output one or more on the basis of input sensor signals.

Figure 3A:
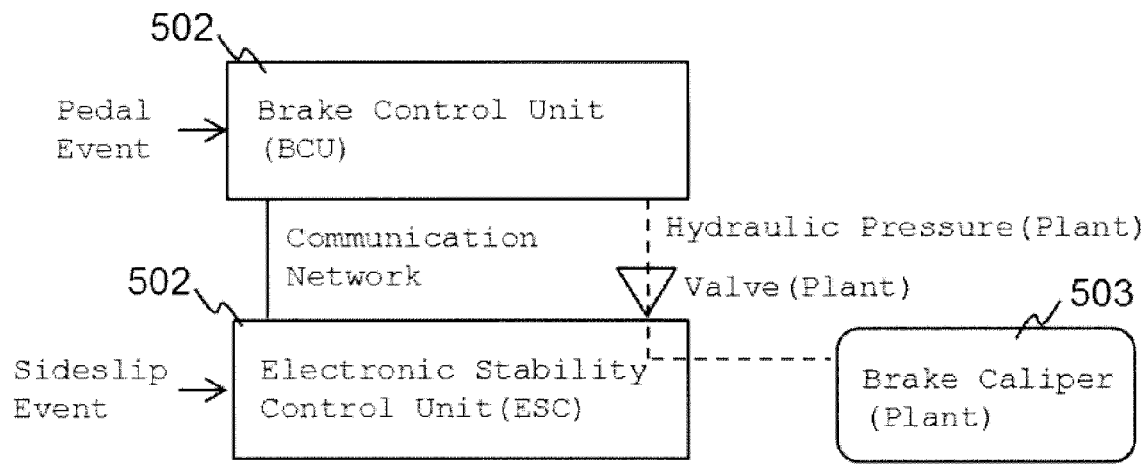
FIG. 3A exemplarily shows an example of a controlled system and FIG. 3B exemplarily shows an example of the respective modeled controlled system.
Figure 3B:
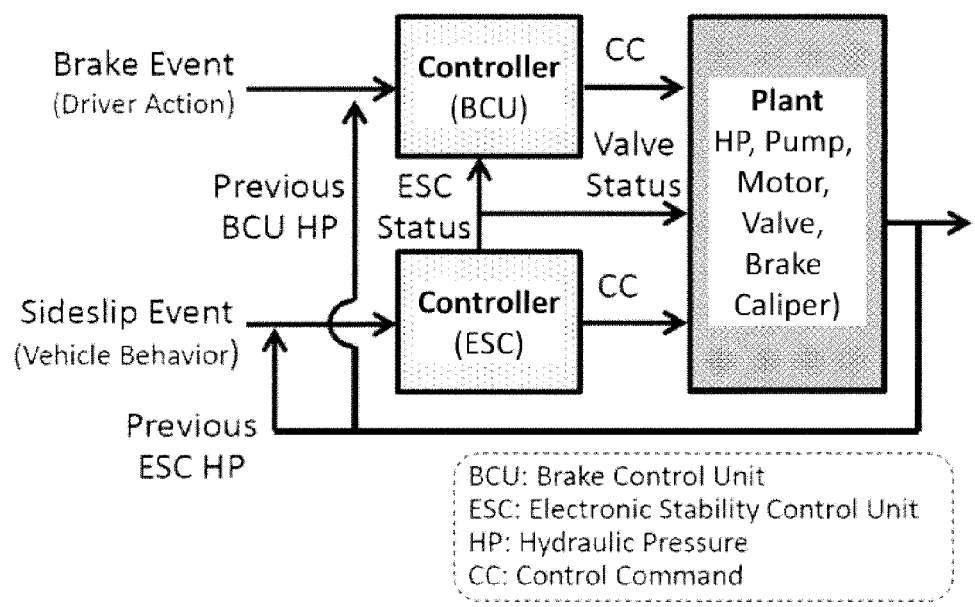

FIG. 3A exemplarily shows an example of a controlled system and FIG. 3B exemplarily shows an example of the respective modeled controlled system. The brake control system comprises two electronic control units, namely the brake control unit 502 (BCU 502) and the electronic stability control unit 502 (ESC 502), which are communicably connected via a communication network (such as a system bus or Controller Area Network CAN, for example). The brake control unit BCU 502 receives input from a brake pedal ("pedal event") and controls a brake caliper 503 as an actuator based on the input from the brake pedal for generating a brake force through hydraulic pressure applied to the brake caliper 503.

The controlled system also has a pressure sensor for detecting a hydraulic pressure in the hydraulic system. A valve of the hydraulic system is controlled by the ESC 502, and the ESC 502 receives an input from a sensor that detects whether or not the automobile is in a state of side slip ("sideslip event") and controls the brake caliper 503 through the hydraulic pressure based on the input only if sideslip of the automobile is detected.

Accordingly, the BCU 502 and the ESC 502 control the brake caliper 502 (speed reducer) based on "shared" hydraulic pressure. A control status of the BCU and ESC 502 is communicated between the two electronic control units. At first, when it is detected that the driver pushes the brake pedal and this is input as a "pedal event" to the BCU 502, the BCU 502 instructs to compress the hydraulic pressure based on the detected driver's pedal stroke to actuate the brake caliper 503 accordingly by hydraulic pressure control.

As long as a "sideslip event" is not detected, the ESC 502 does not act, but as soon as a "sideslip event" is detected and input to the ESC 512, the ESC overtakes control of the brake caliper 503 in that the ESC 502 sends its control status to the BCU 502 which causes the BCU 502 to stop its control of the brake caliper 502 (i.e. the BCU 502 does not work in such situation), and in that the ESC 502 closes the valve (in order to prevent backflow to the BCU side of the hydraulic system) and instructs to increase the hydraulic pressure downstream of the valve (on the brake caliper side) by absorbing hydraulic fluid (e.g. oil) from the hydraulic system from the BCU side of the valve.

When it is detected that the automobile has become stable again (no sideslip occurring anymore), the ESC 502 instructs to re-open the valve, send its new control status to the BCU 502 so that the BCU 502 can take over control again, and the ESC 502 then stops its control at least until a new sideslip event is detected.

However, in typical systems, the BCU 502 and the ESC 502 act on the basis of their respective independent control software codes and it is not sufficient to verify reliability and correct functioning of each of the respective control software (i.e. whether each of the respective control software codes is free of bugs on its own), but is has to be taken into account that an overall system control malfunctioning could arise due to collaboration of the multiple electronic control units.

For example, in some systems, the BCU 502 may additionally have an implemented control to detect leakage of the hydraulic fluid, so as to increase a brake control command if it is detected that a pressure in the hydraulic system is lower than normal e.g. due to fluid leakage in order to still allow the driver to reduce speed for safety even if fluid leakage occurs.

In the above system of FIG. 3A this may lead to an overall system bug even if each of the control software codes of the BCU 502 and the ESC 502 is free of malfunction/bugs independently. For example, if the ESC 502 has taken over control due to a detection of a sideslip event but then stops its control upon the automobile becoming stable again, the BCU 502 will take over control again based on the received status information from the ESC 502 but it may then detect that the pressure is low because the fluid had been absorbed from the upstream side/BCU side of the valve during control by the ESC, which may result in the erroneous application of higher pressure due to the assumed detected fluid leakage (which does not actually occur) and the fluid leakage control may accidentally control the hydraulic pressure to rise and unintentionally act to generate a brake force.

Such control malfunctioning due to causal connections in the collaboration of multiple electronic control units cannot be detected in commonly known software verification techniques in which the control software of a single electronic control unit is tested independently. e.g. by Hardware-In-The-Loop system verification (HIL) of one electronic control unit.

FIG. 4 exemplarily shows a part of control software code data 502 of a BCU of FIG. 3A. The control software code data 502 defines a function BCU_software_execution_1 ms( ) which corresponds to the control function of the BCU of FIG. 3A for a time period of 1 ms, i.e. the BCU exemplarily executes the control function in cycles at each 1 ms.

As a first input parameter, when executing the function BCU_software_execution_1 ms( ), the control software code data 502 takes the input parameter BCU_input_ESC_status, which may exemplarily take values 1 or 0 and indicates the status of ESC control, e.g. 0 for ESC control not working and 1 for ESC control working. If the input parameter BCU_input_ESC_status is equal to 0, the BCU control function is executed, and else (e.g. when the input parameter BCU_input_ESC_status is equal to 1), the BCU does not work during the respective 1 ms cycle.

If it is detected that the BCU_input_ESC_status is equal to 0, the control software code data 502 of the BCU calculates a parameter referred to as "ratio" by taking the quotient of the input parameters BCU_input_pedal_stroke, which indicates the sensor value of the sensor detecting the pedal stroke of the brake pedal by the user, and BCU_input_hydraulic_pressure, which indicates the sensor value of a pressure sensor detecting the pressure in the BCU side of the hydraulic system. Specifically, in case of a fluid leakage in the hydraulic system, the detected pressure is low even if the pedal stroke is large.

Then, it is exemplarily detected whether the calculated value "ratio" is smaller than 2, and, if ratio <2, the normal brake control is executed in which the output parameter BCU_output_brake_control_command is calculated based on the pedal position of the brake pedal (here: software_input_pedal_sensor_value, may be equal to the above-mentioned parameter BCU_input_pedal_stroke_value). The calculated BCU_output_brake_control_command is then used to actuate an actuator controlling the pressure in the hydraulic system to actuate the brake caliper accordingly.

On the other hand, if the calculated ratio is not smaller than 2, it is assumed that a fluid leakage has occurred and a failsafe mode is executed in which the BCU_output_brake_control_command is output as a high value for safety reasons. Here, the constant value of 10 is used for reasons of simplification and it is to be understood that the actual failsafe mode should output a high control command that is fluctuant in accordance with the situation (e.g. based on further sensor input).

Summarizing the BCU control, the BCU can calculate a brake control command in accordance with a pedal sensor value indicating a position of the pedal stroke of the driver, if no fluid leakage has occurred and when the ESC does not work. On the other hand, when the ESC takes over control (i.e. when the BCU_input_ESC_status), the BCU does not work and does not output any brake control command. In addition, the BCU control provides a fluid leakage detection function that is configured to detect a fluid leakage in the hydraulic system based on a comparison of the pedal stroke and the hydraulic pressure.

FIG. 5 exemplarily shows a part of control software code data 502 of an ESC of FIG. 3A. The control software code data 502 of the ESC defines a function ESC_software_execution_1 ms( ) which corresponds to the control function of the ESC of FIG. 3A for a time period of 1 ms, i.e. the ESC exemplarily executes the control function in cycles at each 1 ms. Here, it is to be noted that the cycle time of the ESC is exemplarily the same as the cycle time of the BCU described above, however, the present invention is not limited to be applied to systems having electronic control units of the same cycle time but can be applied also to systems of different cycle times due to system synchronization described further below.

The function ESC_software_execution_1 ms( ) takes the input parameter referred to as car_sideslip_event, which exemplarily indicates whether a side slip of the vehicle occurs (the parameter car_sideslip_event is equal to 1) or whether the automobile is stable (no side slip, and the parameter car_sideslip_event is equal to 0). The parameter car_sideslip_event is input from one or more sensors indicating the behavior of the automobile including acceleration sensors, gyrosensors, and/or traction control sensors.

If it is detected that the parameter car_sideslip_event is equal to 0, the ESC does not work and outputs an output parameter ESC_output_ESC_status as being 0 that can then input to the BCU (i.e. as the BCU_input_ESC_status mentioned above). Otherwise, if a car side slip event is detected and the parameter car_sideslip_event is not equal to 0, the ESC outputs the output parameter ESC_output_ESC_status as being 1 that can then input to the BCU (i.e. as the BCU_input_ESC_status mentioned above) in order to indicate to the BCU that ESC has taken over control.

In addition, in the case the parameter car_sideslip_event is not equal to 0, the ESC outputs the output parameter ESC_output_brake_control_command. Here, exemplarily the ESC outputs a constant value as brake control command, however, this is for reasons of simplification but is not meant to be understood as a limitation of the invention. Specifically, it is preferred that the control command value is fluctuant in accordance with the vehicle situation during the side slip based on the other sensor input.

In addition, while not shown here in FIG. 5 because it is exemplarily assumed that the valve of the hydraulic system is an automatically working backflow prevention valve for reasons of simplification, in case the parameter car_sideslip_event is not equal to 0, the ESC could further output a control command to an actuator for closing the valve if the valve were to be realized as a controlled valve (e.g. an solenoid controlled valve).

Summarizing the ESC control, the ESC unit can output a brake control command (and potentially actively close the valve to the BCU side in the hydraulic system) in accordance with sensor input that indicates that a side slip of the automobile occurs. Also, when the ESC unit takes over the brake control from the BCU, the ESC status is output to the BCU by output parameter ESC_output_ESC_status (which is then input to the BCU as BCU_input_ESC_status). As long as no side slip occurs, the ESC unit does not work.

FIG. 6 exemplarily shows a part of plant simulation code data 503 of the controlled system of FIG. 3A. It is to be noted that the plant simulation code data is to be distinguished from the control software code data mentioned above for the BCU and the ESC, because the control software code data corresponds to or is at least based on actual control software code of the electronic control units BCU and ESC, respectively, that is to be tested by the verification system of the embodiment. The plant simulation code data artificially describes the behavior of the controlled system/plant and it takes the output parameters of electronic control units and generates corresponding output parameters that correspond to sensor input that can then be input to the electronic control units (to the function of the software code data to be executed) for the next cycle.

For a controlled system of an automobile, such as the system of FIG. 3A, the corresponding plant simulation code data can be executed to simulate the controlled system/plant and especially the behavior of the controlled system/plant based on commands output from the electronic control units, and it may furthermore simulate the behavior of a driver according to one or more driving scenarios to be tested. The plant simulation code data is configured to update the current status of the controlled system/plant based on the control commands input to the controlled system, including calculating corresponding sensor values of sensors of the system and updating/calculating internal values describing the status of the controlled system/plant.

It is to be noted that the plant simulation code data can be created manually by a user depending on the requirements, or the user may generate the plant simulation code data based on a plant model by using automatic code generators such as MATLAB/Simulink (e.g. a Simulink Coder at a discretization time that may be preferably be selected on the basis of a sampling theorem) or the like.

The exemplary plant simulation code data 503 of FIG. 6 defines a function plant_update( ) that defines a function of updating the plant on the basis of plural input parameters including control command parameters input from the ECU and the ESC.

At first, the plant simulation code data 503 of FIG. 6 detects the value of the input parameter plant_input_valve_status which indicates whether the valve of the hydraulic system is open (plant_input_valve_status is equal to 0) or whether the valve of the hydraulic system is closed (plant_input_valve_status is equal to 1). The parameter plant_input_valve_status may be determined, e.g., based on a status of the ESC or a comparison of the BCU side pressure and the ESC side pressure.

Exemplarily, if the valve is detected to be opened in that the plant_input_valve_status is equal to 0, the plant simulation code data 503 uses an input parameter driver_pedal_event in order to determine the output parameter plant_output_pedal_stroke that indicates the sensor value of a sensor detecting the position of the brake pedal. The parameter driver_pedal_event indicates whether the driver pushes the brake pedal or not. If the driver pushes the brake pedal, this is indicated by the parameter driver_pedal_event being 1, and if the driver does not push the brake pedal, this is indicated by the parameter driver_pedal_event being 0.

If the user is simulated to not push the brake pedal, the parameter driver_pedal_event is equal to 0 and the parameter plant_output_pedal_stroke is set to 0, while if the user is simulated to push the brake pedal, the parameter driver_pedal_event is equal to 1 and the parameter plant_output_pedal_stroke is exemplarily set to a constant value 10 in the present example for reasons of simplicity. However, it is to be understood that the parameter plant_output_pedal_stroke can be made fluctuant in accordance with a simulation of the detailed driver's behavior and driver's action.

In addition, in the FIG. 6, exemplarily functions with the prefix "tf_", such as e.g. "tf_pedal_stroke", are used and these prefixes indicate a transfer delay of the corresponding function/parameter in the update of the plant behavior. For example, the function plant_update( ) may use the previous parameters from the last call of the function plant_update( ) in this call, and the parameters set with the prefix "tf_" will be updated not until the next call of the function plant_update( ), for example.

Furthermore, the plant simulation code data 503 is configured to cause a determination of a parameter plant_output_hydraulic_pressure which indicates, as an output parameter of the simulation of the controlled system/plant, a pressure value in the hydraulic system of the controlled system of FIG. 3A. The parameter plant_output_hydraulic_pressure is determined on the basis of a function tf_hydraulic_pressure of the input parameter plant_input_BCU_brake_control_command that corresponds to the brake control command that is output from the brake control unit BCU. The plant_output_hydraulic_pressure also may correspond to the value that would be output from the pressure sensor of the controlled system and may be input to the brake control unit BCU.

As another parameter, the plant simulation code data 503 is configured to cause a determination of a parameter brake_force which indicates a brake_force that would be applied by the brake caliper 503. The parameter brake_force is determined based on a function tf_brake_force on the basis of the hydraulic pressure of the hydraulic system, i.e. on the basis of plant_output_BCU_hydraulic pressure which may be equal to the above-mentioned plant_output_hydraulic_pressure.

On the other band, if the valve is detected to be closed in that the plant_input_valve_status is equal to 1, the plant simulation code data 503 is configured to also cause the determination of a parameter plant_output_hydraulic_pressure which indicates, as an output parameter of the simulation of the controlled system/plant, a pressure value in the hydraulic system of the controlled system of FIG. 3A. However in this situation, the plant simulation code data 503 is first configured to cause determination of another pressure parameter plant_inside_ESC_hydraulic_pressure (which indicates the pressure of the hydraulic system on the ESC side downstream of the valve that is now closed, so that there may be a pressure difference between upstream and downstream of the valve).

The parameter plant_inside_ESC_hydraulic_pressure is determined on the basis of the function tf_hydraulic_pressure but now as a function of the input parameter plant_input_ESC_brake_control_command that corresponds to the brake control command that is output from the electronic control unit for stability control (ESC). As another parameter, the plant simulation code data 503 is configured to also cause a determination of the parameter brake_force, which indicates a brake_force that would be applied by the brake caliper 503, in the scenario of the closed valve. The parameter brake_force is again determined based on a function tf_brake_force on the basis of the hydraulic pressure of the hydraulic system, but now based on the pressure on the side of the ESC i.e. on the basis of plant_inside_ESC_hydraulic_pressure.

Finally, the plant simulation code data 503 is configured to also cause that the output parameter plant_output_hydraulic_pressure is set to the determined value of the parameter plant_inside_ESC_hydraulic_pressure. In this situation, plant_output_hydraulic_pressure would not be equal to the plant_output_BCU_hydraulic_pressure due to the above-mentioned pressure difference occurring when the valve is closed, and hydraulic fluid is absorbed from the BCU side of the hydraulic system.

However, as mentioned above, this may lead to a situation in the controlled system in the next cycle, when executing the BCU control code data 502 of FIG. 4 and if the ESC does not work anymore because the car has become stable, that the parameter "ratio" will be determined to be larger than 2 despite the fact that no actual fluid leakage occurs in the hydraulic system. Such situation would represent a control malfunctioning that is not due to a bug in the control software code data of any of the electronic control units but rather would represent a difficult to detect overall system bug that only appears in the collaboration of electronic control units that each have their independent control software code data. However, in the verification process of embodiments of the invention, even such difficult to detect system bugs can be found during the verification.

As explained above, for the present embodiment, there is provided a respective part of a control software code data for each of the electronic control units of a controlled system, wherein each respective control software code data relates to the control behavior of the electronic control unit by receiving one or more input parameters used for control by the respective electronic control unit and determining the one or more output parameters (in particular control commands) of the respective electronic control unit based on the received one or more input parameters.

In addition, for the present embodiment, there is provided at least one unit of plant simulation code data for simulating the behavior of the controlled system/plant and for updating the current status of the plant. Of course, in further embodiments, multiple units of plant simulation code data can be provided for simulating different parts or portions of the controlled system/plant.

The simulation of the controlled system/plant by execution of the functions defined by the plant simulation code data receives output values/output parameters from the electronic control unit(s) as input values/input parameters and determines on the basis thereof the one or more output values/output parameters that are then input to the electronic control units as input values/input parameters (e.g. representing sensor values). Also, the execution of the functions defined by the plant simulation code data can determine internal parameters, such as e.g. brake-force mentioned above, that describe a status of the controlled system/plant.

As mentioned above, in the controlled system, each output parameter of an electronic control unit may be used as an input parameter for one or more other electronic control units (such as e.g. ESC_output_ESC_status to be used as BCU_input_ESC_status) and/or as an input parameter for the simulation of the controlled system/plant in the plant simulation code data (such as e.g. BCU_output_brake_control_command to be used as plant_input_BCU_brake_control_command). On the other hand, each output parameter of the simulation of the controlled system/plant may be used as an input parameter for one or more other electronic control units (such as e.g. plant_output_pedal_stroke_value to be used as BCU_input_pedal_stroke_value).

FIG. 7 exemplarily shows collaboration information data 504 for the controlled system of FIG. 3A. The specific format of the collaboration information data 504 is not limited. The information indicated in the collaboration information data 504 is used later in the generation of collaboration module code data 508.

The collaboration information data 504 indicates relationships of input parameters and output parameters, and it indicates a mapping of specific output parameters to the corresponding associated input parameters from control units to control units, from control units to the controlled system/plant and/or from the controlled system/plant to the control units. That is, the information of the collaboration information data 504 indicates the relationship of parameters and the direction of data flow, i.e. from one specific output parameter to the associated input parameter.

For example, the collaboration information data 504 of FIG. 7 describes relationships of input and output parameters for the system of FIG. 3. For example, the output parameter BCU_output_brake_control_command used in the BCU control software code data of FIG. 4 is mapped/associated to/with the input parameter plant_input_BCU_brake_control_command used in the plant simulation code data 503 of FIG. 6 (from the electronic control unit BCU to the controlled system/plant: "software to plant").

On the other hand, for example, the output parameter plant_output_BCU_hydraulic_pressure used in the plant simulation code data 503 of FIG. 6 is mapped/associated to/with the input parameter BCU_input_hydraulic pressure used in the BCU control software code data of FIG. 4 (from controlled system/plant to the electronic control unit BCU: "plant to software"). Regarding relationships or output parameters and input parameters of different electronic control units, the collaboration information data 504 of FIG. 7 indicates a relationship in which the output parameter ESC_output_ESC_status used in the ESC control software code data of FIG. 5 is mapped/associated to/with the input parameter BCU_input_ESC_status used in the BCU control software code data of FIG. 4 (from one electronic control unit to another electronic control unit: "ECU to ECU").

FIG. 8 exemplarily shows system input information data 505 for test purposes of the controlled system of FIG. 3. The specific format of the system input information data 505 is not limited. The information indicated in the system input information data 505 is used later in the generation of symbolic module code data 511.

The system input information data indicates parameters to be varied during software verification as variables (system input), and it additionally exemplarily indicates a time duration that indicates the possible time of input value change. Exemplarily, the system input information data 505 of FIG. 8 indicates the parameters "driver_pedal_event" used in the plant simulation code data 503 of FIG. 6 and "car_sideslip_event" used in the ESC control software code data of FIG. 5 as system input variables to be varied during software verification, and for both system input variable parameters the duration of variation time is exemplarily set to 2000 (in units of ms, i.e. the functions BCU_software_execution_1 ms( ) and ESC_software_execution_1 ms( ) of the control software code data, each corresponding to a cycle time of 1 ms, can be called 2000 times).

FIG. 9 exemplarily shows verification requirement information data 506. The specific format of the verification requirement information data 506 is not limited. The information indicated in the verification requirement information data 506 is used later in the generation of assertion module code data 510.

The verification requirement information data 506 of FIG. 9 exemplarily indicates a verification time of software testing, and the verification time is exemplarily set to 5000 ms (i.e. the functions BCU_software_execution_1 ms( ) and ESC_software_execution_1 ms( ) of the control software code data, each corresponding to a cycle time of 1 ms, can be called 5000 times during verification).

In addition, the verification requirement information data 506 of FIG. 9 exemplarily indicates a verification requirement (verification condition) which corresponds to a condition that represents a control error. Exemplarily, the verification requirement is defined as a condition in which unintended braking would occur, specifically a condition in which the driver does not push the brake pedal (parameter_pedal_event is equal to 0) since at least 500 ms (parameter pedal_off_time larger or equal to 500) while the automobile is stable (no sideslip, parameter side_slip_event is equal to 0) since at least 500 ms (parameter sideslip_off_time larger or equal to 500) and still the parameter brake_force is increased since the last call of the function plant_update( ) (parameter brake_force_increase is larger than 0).

It is to be noted that the above parameters pedal_off_time, sideslip_off_time and brake_force_increase are not used in the functions BCU_software_execution_1 ms( ) or ESC_software_execution_1 ms( ) of the control software code data or the function plant_update( ) of the plant simulation code data, but are parameters that indicate information or information change between multiple calls of the functions BCU_software_execution_1 ms( ) or ESC_software_execution_1 ms( ) of the control software code data or the function plant_update( ) of the plant simulation code data during the verification process.

For example, the parameter pedal_off_time may be represented by a counter that initiates counting after a release of the brake pedal is indicated by the parameter pedal_event switching from 1 to 0. The parameter sideslip_off_time may be represented by a counter that initiates counting after the automobile becomes stable indicated by the parameter car_sideslip_event switching from 1 to 0. The parameter brake_force_increase indicates the amount of change of the calculated value of the parameter brake_force determined by execution of the function plant_update( ) of the plant simulation code data at a current iteration compared to the last call of the function plant_update( ), wherein a positive value may indicate an increase of the calculated brake force and a negative value may indicate a decrease of the calculated brake force.

The time resolution may depend on the discrete time of the controlled system/plant. Typically, the time resolution of the plant simulation is smaller than the cycle time of the electronic control units (i.e. the frequency of calling the plant simulation may be larger than the frequency of calling the control software code data functions of the electronic control units).

FIG. 10 exemplarily shows a part of collaboration module code data 508 based on the collaboration information data 504 of FIG. 7. For example, the collaboration module code data 508 can be created manually or, preferably, the collaboration module code data 508 is automatically generated by a code generator on the basis of the collaboration information data 504 of FIG. 7.

The collaboration module code data 508 comprises one or more functions of copying one or more output parameters to one or more input parameters. Specifically, the collaboration module code data 508 comprises one or more functions of copying one or more output parameters of one or more electronic control units to one or more input parameters of the simulation of the controlled system/plant, one or more functions of copying one or more output parameters of one or more electronic control units to one or more input parameters of one or more electronic control units, and/or one or more functions of copying one or more output parameters of the simulation of the controlled system/plant to one or more electronic control units.

Here, the collaboration module code data 508 of FIG. 10 exemplarily comprises a definition for three functions copy_software_to_plant( ), copy_plant_to_software( ), and copy_ECU_to_ECU( ). The function copy_software_to_plant( ) causes the output parameters of the function of the control software code data of BCU and the ESC to associated input parameters of the simulation of the controlled system/plant according to the association as indicated in the collaboration information data 504 under "software to plant".

The function copy_plant_to_software( ) causes the output parameters of the simulation of the controlled system/plant to the associated input parameters of the function of the control software code data of BCU and the ESC according to the association as indicated in the collaboration information data 504 under "plant to software". The function copy_ECU_to_ECU causes the output parameters of the function of the control software code data of the ESC to the associated input parameter of the function of the control software code data of the BCU according to the association as indicated in the collaboration information data 504 under "ECU to ECU".

Summarizing, the collaboration module code data 508 works for the data synchronization between the control software of the electronic control units and the controlled system/plant. The collaboration module code data 508 defines executable functions for copying sensor data and sensor values indicating the behavior of the controlled system/plant from the plant side to the control software side and executable functions for copying control commands that indicate command output to actuators of the controlled system/plant from the control software side to the plant side.

In systems that have more than one electronic control units, the collaboration module code data 508 may further define executable functions for copying control output parameters from one electronic control unit to the corresponding input parameters of another electronic control unit of the system.

FIG. 11 exemplarily shows a part of symbolic module code data 511 based on the system input information data of FIG. 8. Exemplarily, the symbolic module code data 511 of FIG. 11 is formulated in a format for the KLEE symbolic execution based verification tool and defines a function symbolic_module( ) exemplarily based on syntax required for the KLEE symbolic execution based verification tool making use of the commands klee_make_symbolic.

Specifically, the function symbolic_module( ) is created on the basis of the system input information data of FIG. 8 and instructs the symbolic execution based verification tool 6 to use symbolic variables X and Y for the parameters driver_pedal_event and car_sideslip_event indentified in the system input information data of FIG. 8, and it transforms the parameter driver_pedal_event into X and the parameter car_sideslip_event into Y.

However, based on the time 2000 indicated in the system input information data, the functions klee_make_symbolic are only called if the time counting parameter v_time is equal to 0 modulo 2000, i.e. in case v_time is a integer multiple of 2000. Accordingly, the symbolic transformation is performed every 2000 ms as exemplarily defined in the system input information data.

Generally, the symbolic module code data transforms system input into abstract symbols such as X and Y or the like in preparation of a symbolic execution based verification of the control software. This has the advantage that software verification does not need to walk through various logic paths with various numerically set values but may test and verify the possible paths by using abstract variables that may cover multiple situations in an abstract way on the basis of paths conditions.

FIG. 12 exemplarily shows a part of assertion module code data 510 based on the verification requirement data of FIG. 9. The assertion module code data 510 provides an executable function assertion_module( ) which comprises an if-clause that checks whether the verification requirement condition is met, and, if it is met, the function klee_assert(0) is executed and notifies an occurrence of an error/bug to the user in order to inform the user that a path condition has been found that allows the system to arrive in a state that meets the unintended verification requirement condition. The output to the user preferably outputs the path condition (i.e. the conditions for the system input variables in order to get from initial conditions to the situation in which the verification condition is met).

The function klee_assert( ) is a specific function of the symbolic execution based verification tool KLEE but the present invention is not limited to the use of this symbolic execution based verification tool, and other symbolic execution based verification tools can be used. Generally, the assertion module code data 510 may have one or more executable functions for checking one or more verification requirement conditions, and if it is determined that one of the verification requirement conditions is met, the user is notified about the detection of an erroneous control condition. e.g. when the safety system specification is violated when the verification condition is met.

The if-clause condition in the function assertion_module( ) of the assertion module code data 510 of FIG. 12 is created based on the verification requirement information of the verification requirement information data 506 of FIG. 9. For example, it may be generated manually or automatically, e.g. by a code generator based on the provided verification requirement information data 506.

FIG. 13 exemplarily shows a part of synchronization module code data 509. The synchronization module code data defines a function main( ) that invokes the respective control software and simulation software at the appropriate timings, e.g. in accordance with software source codes, control software code data, plant simulation code data, or the input information.

Exemplarily, the function main( ) performs a for-loop iteration process for the parameter v_time that indicates a time of the verification process and is iterated (incremented), exemplarily, starting from an initial value v_time=0 up to the maximal value MAX. For example, the iteration of the parameter v_time may correspond to iteration steps of 1 ms each, in accordance with the cycle time of the BCU and ESC above. Also, the parameter v_time may be iterated by different units corresponding to a time period that is smaller or larger than 1 ms.

For each iteration of the iteration process. i.e. for each verification time step in the iteration of incrementing the time parameter v_time, the different functions of the other modules of code data for control software of electronic control units and the simulation of the controlled system/plant mentioned above are called.

At first, the executable function symbolic_module( ) of the symbolic module code data 511 is executed to initiate symbolic execution by transferring the system input parameters to the corresponding abstract symbols for the symbolic execution, at least if the time condition v_time % 2000==0 of the symbolic module code data 511 is met i.e. when the parameter v_time is an integer multiple of 2000.

The synchronization module code data 509 summarizes the control functions of the electronic control units by providing an executable function software_execution which calls the functions BCU_software_execution_1 ms( ) and ESC_software_execution_1 ms( ) (within the if-clauses) exemplarily only if the parameter v_time % 1==0. i.e. if the parameter v_time is a multiple integer of 1. Here, this allows to provide a synchronization for calling the control functions of the electronic control units. And the functions of different electronic control functions can be called at different timings and/or at different frequencies, and also at different timings and/or frequencies compared to the simulation of the controlled system/plant.

In the main function of the assertion module code data 510, after the call of the symbolic module (symbolic_module) for symbolic execution, one control cycle is simulated by performing the steps of updating the current status of the controlled system/model by calling the function plant_update( ) of the plant simulation code data, transferring the output values of the simulation of the controlled system according to the updated status to the associated input parameters of the control software of the electronic control units in the control software code data by calling the function copy_plant_to_software( ) of the collaboration module code data, performing a control cycle of the electronic control units by calling the above-mentioned function software_execution as a function of the time parameter v_time of this iteration, and transferring the output values of the simulation of the control cycle of the electronic control units to the associated input parameters of the control software of the other electronic control units in the control software code data by calling the function copy_ECU_to_ECU( ) of the collaboration module code data and to the associated input parameters of the simulation of the controlled system/plant by calling the function copy_software_to_plant( ) of the collaboration module code data.

Then, the counters are incremented by elapsed_time++ so as to indicate that the time parameter has been incremented by one unit. In the present example, this increments the counters pedal_off_time and sideslip_off_time.

Then, the function assertion_module( ) is called so as to perform a check whether the verification requirement condition is met at the time v_time of the current iteration before going to the next iteration.

Figure 14:
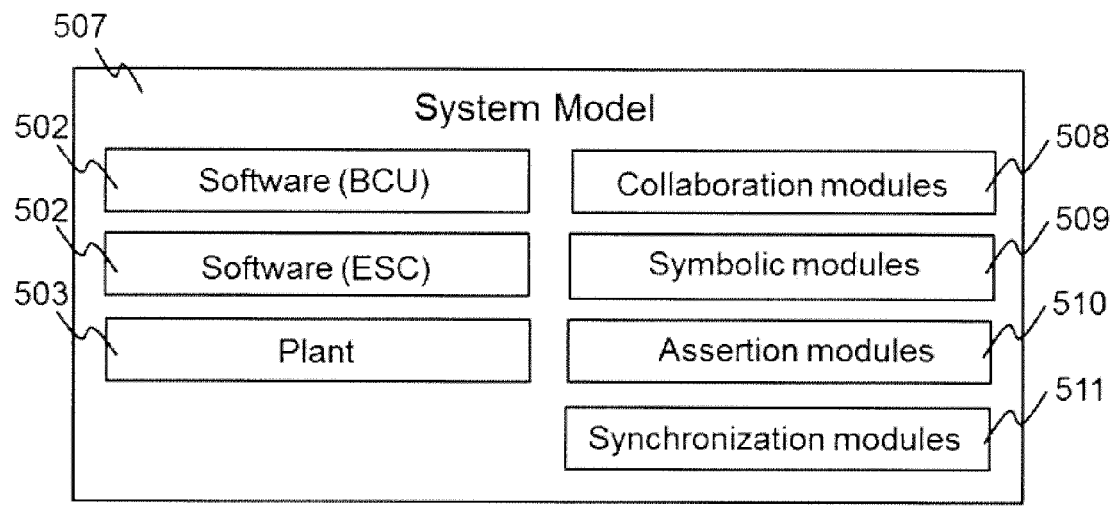
FIG. 14 exemplarily shows a configuration of system model data.

FIG. 14 exemplarily shows a configuration of system model code data 507. The system model code data 507 comprises the control software code data 502 of the electronic control units (here BCU and ESC), the plant simulation code data 503 of the controlled system/plant, the collaboration module code data 508, the symbolic module code data 509, the assertion module code data 510, and the synchronization module code data 511.

Figure 15:
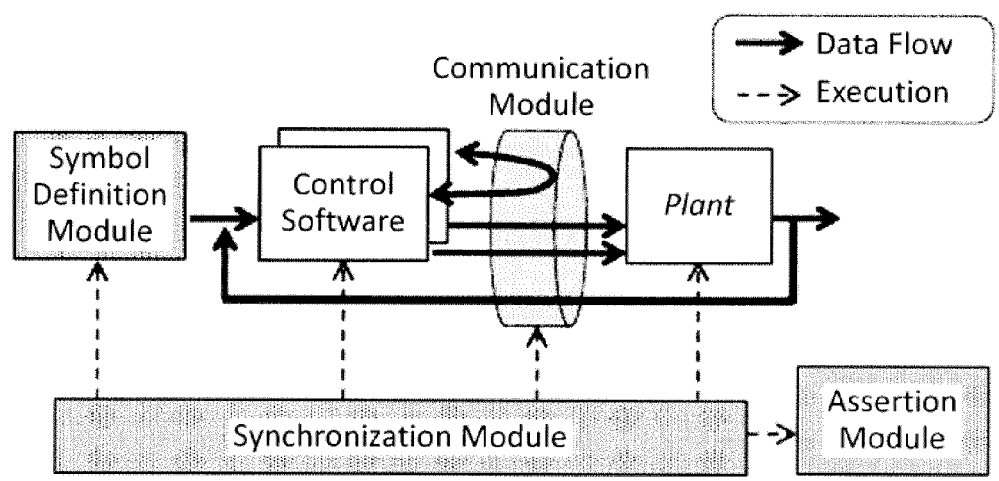
FIG. 15 exemplarily shows an overview of the system model structure.

FIG. 15 exemplarily shows an overview of the system model structure. The system model advantageously involves a communication module for data synchronization and a synchronization module for time synchronization between the modules of the system module.

The data synchronization may make system internal interactions between control software and plant. Hence, the communication module may copy the current control command, which control software calculates for actuator control, into plant input which receives output from controller model e.g. in Simulink. The module also may copy the current sensor value which indicate plant behavior measured into control software input which receives output from plant model e.g. in Simulink. The interaction between ECUs may be supported by the module as well.

The synchronization module may keep the current state of control software and plant by sequential and iterative invocation at appropriate timing. Additionally, the module may limit the verification time in the system internal time in order to make bounded state transitions. Basically, a control system may keep control loops by updating control software periodically and does not have the end except for power supply events. Consequently, the proposed verification platform's users may have to decide bounded time in order to obtain verification results in some embodiments. The bounded time may depend on the property of the target system. For example, if users want to see the system effect caused by the combination of liming or sequence of varied system inputs, the bounded time should preferably be defined to take them into account. Also, for symbolic execution based formal verification, there may be provided symbol definition modules and assertion modules in the system model. The symbolic definition module may define system inputs such as user operations or events from the environment of the verification target effecting the plant behavior as symbols. To change the value of the system inputs during the verification, the module may redefine them. However, as the redefinition creates new symbols, the verification time increases. Especially, the solver's execution time depending on the number of symbols increases. To avoid the frequent redefinition, the redefinition using branch instructions in according with a specific timing such as e.g. every 1 second, an event trigger, and so on, may be provided. However, it may cause huge verification time because of exponentially increasing the number of the possible paths. Consequently, the decision of optimal redefinition frequency is important for the control system verification. Additionally, as the system model updates its plant behavior at every discretization time, the decision of optimal discretization time may become important as well. The discretization time should preferably be determined on the basis with a sampling theorem. The assertion module, which may be an assertion code, may cheek the property of the control system by monitoring focusing variables of the system model.

Figure 16:
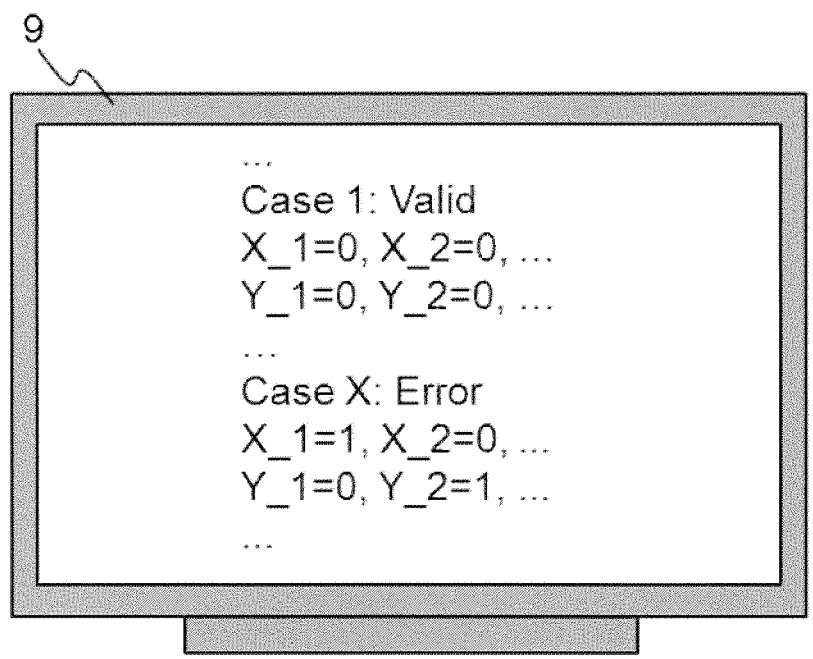
FIG. 16 exemplarily shows a display of an exemplary verification result.

FIG. 16 exemplarily shows a display of an exemplary verification result on the display 9. At the end of verification of the control software code data, i.e. at the end of verification time as defined in the verification requirement information, the verification result is shown and the verification result indicates the occurrences of detection of an error in which the verification requirement condition was met at a certain path condition which is indicated as well, wherein the path condition defines the conditions for the system input parameters to arrive at the erroneous situation of the detected error. Also, exemplarily, the path conditions of valid paths are indicated in the display of FIG. 15.

Figure 17:
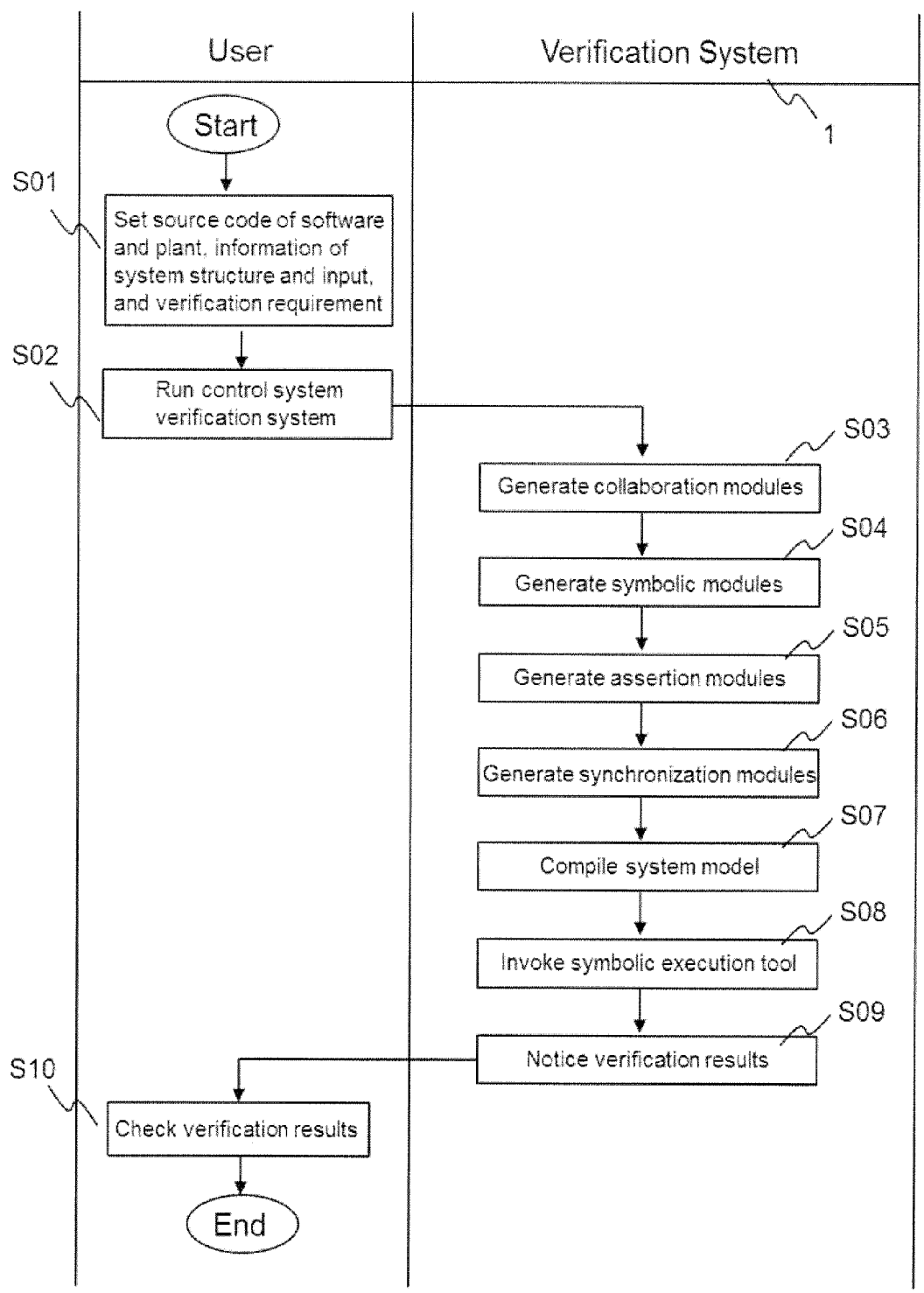
FIG. 17 exemplarily shows a flow chart of a process of verification for control software testing according to an embodiment.

FIG. 17 exemplarily shows a flow chart of a process of verification for control software testing according to an embodiment.

At first, in step S01 provides the control software code data 502 of the one or more involved electronic control units, the plant simulation code data 503, the collaboration information data 504, the system input information 505 and the verification requirement information data 506. That is, the user sets the source codes of the electronic control unit(s), the source code of the plant simulation, the information on the system structure and relationships of inputs and outputs, the information on the system input that indicates the variables of the verification process, and information on the verification condition to be tested.

In step S02, the user initiates/starts the verification process at the verification system that runs the verification process. Based on the provided data, the verification system 1 utilizes the system verification tool 5, and the system model constructor 501 is adapted to generate the system model 507 (e.g. FIG. 14) on the basis of the provided data.

In step S03, the system model constructor 501 generates the collaboration module code data 508 based on the collaboration information data 504, and, in step S04, the system model constructor 501 generates the symbolic module code data 513 based on the system input information data 505. In step S05, the system, model constructor 501 generates the assertion module code data 510 on the basis of the verification requirement information data 506, and in step S06, the system model constructor 501 generates the synchronization module code data 500 in accordance with the control software code data of the electronic control units, the plant simulation code data and the collaboration module code data.

It is to be noted in the above, that the order of execution of the steps S03 to S06 for building the system model 507 (system model code data) can be performed in any order or even in parallel, and the invention is not limited to the order of FIG. 16.

In the step S07, the system model 507 is utilized to create an executable program that can be run by the operating unit 3 of the verification system 1. Specifically, in case the system model 507 is provided as system model code data, the step S07 uses a compiler to compile the system model code data for verification purposes, e.g. for symbolic execution.

In the next step S08, the operating unit 3 executes the system model 507 executable program (e.g. compiled system model code data) and invokes the symbolic execution based verification tool 6 in order to verify by symbolic execution whether there are software any execution paths when running the executable system model program to arrive in one or more conditions that meet the set verification requirement condition. If such erroneous situation is found, the corresponding error is notified to the user and the path condition is indicated.

In step S09, the symbolic execution based verification tool 6 notifies the verification results to the user e.g. via the display 9, and in step S10 the user checks the verification results and the path conditions of the path of the execution tree that arrived at the situation that meets the set verification requirement.

Summarizing, the exemplary embodiment allows for reliable and efficient testing of control software of electronic control units in controlled systems/plants having one or more electronic control units (ECU) for ECU test or system tests. This enables the user to efficiently and reliably find system bugs in an electronic mechatronic control system such as automotive systems, construction machinery systems or other embedded systems and control systems during the development phase.

The invention can be efficiently and reliably applied to the development of control systems comprising one electronic control unit, two electronic control units that, communicate among each other and/or share control over one or more actuators of the controlled system or even more than two electronic control units. The invention allows to advantageously find even system bugs that could not have been found in known verification techniques since some system bugs may only appear in specific situations by collaboration of multiple electronic control units based on system states and user operation or specific combinations of system status and user operation.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data, processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted, programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different, processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

What is claimed is:

1. Method for testing control software of a controlled system, the controlled system comprising one or more electronic control units, one or more actuators, and one or more sensors, each sensor being adapted to input a respective sensor signal to at least one of the one or more electronic control units and each actuator being adapted to act responsive to respective control signals input from at least one of the electronic control units, and each electronic control unit being configured to execute a respective executable control program based on control software code data to output one or more control signals to the one or more actuators on the basis of input sensor signals, the method comprising:
providing control software code data for each of the one or more electronic control units;
providing simulation code data for the controlled system;
providing verification requirement information data that indicates one or more verification requirement conditions corresponding to a respective control error situation;
creating a system model based on the provided simulation code data and the provided control software code data provided for each of the one or more electronic control units;
creating an executable program based on the created system model; and
performing a software verification process on the basis of the executable program, the software verification process comprising:
iterating through an execution tree of the executable program according to one or more path conditions of the executable program;
checking, at each iteration, whether at least one of the one or more verification requirement conditions is fulfilled; and
notifying a user about the detection of the control error situation in case it is determined that at least one of the one or more verification requirement conditions is fulfilled,
wherein performing the software verification process on the basis of the executable program comprises performing symbolic execution on the basis of the system model.

2. Method according to claim 1, wherein
creating the executable program based on the created system model comprises transferring one or more parameters of the system model into symbols for symbolic execution.

3. Method according to claim 2, further comprising
providing system input information data that indicates the one or more parameters of the system model to be transferred into symbols for symbolic execution.

4. Method according to claim 3, wherein
the system model comprises symbolic module code data defining a function for transferring parameters to symbols based on the provided system input information data.

5. Method according to claim 1, further comprising
outputting a specific path condition associated with the detected control error situation.

6. Method according to claim 1, further comprising
providing collaboration information data that indicates associations of related input parameters and output parameters of the provided control software code data and the provided simulation code data.

7. Method according to claim 6, wherein
the system model comprises collaboration module code data indicating one or more functions of copying output parameters to associated input parameters based on the provided collaboration information data.

8. Method according to claim 7, wherein
the collaboration module code data indicates a first function of copying output parameters of control software code data of one or more electronic control units to associated input parameters of control software code data of one or more electronic control units, a second function of copying output parameters of control software code data of one or more electronic control units to associated input parameters of the simulation code data, and/or a third function of copying output parameters of the simulation code data to associated input parameters of control software code data of one or more electronic control units.

9. Method according to claim 1, wherein
the system model comprises synchronization module code data indicating synchronization between execution of one or more functions of the control software code data for the one or more electronic control units and the simulation code data for the controlled system.

10. Method according to claim 9, wherein
the synchronization module code data indicates an executable function which indicates an execution order and execution timing of executable functions of the control software code data for the one or more electronic control units and the simulation code data, enabling different execution frequencies for functions of the control software code data compared to functions of the simulation code data.

11. A verification system for testing control software of a controlled system,
the controlled system comprising one or more electronic control units, one or more actuators, and one or more sensors, each sensor being adapted to input a respective sensor signal to at least one of the one or more electronic control units and each actuator being adapted to act responsive to respective control signals input from at least one of the electronic control units, and each electronic control unit being configured to execute a respective executable control program based on control software code data to output one or more control signals to the one or more actuators on the basis of input sensor signals,
the verification system comprising:
a data providing unit configured to provide control software code data for each of the one or more electronic control units, to provide verification requirement information data that indicates one or more verification requirement conditions corresponding to a respective control error situation, and to provide simulation code data for the controlled system;
a system model constructor configured to create a system model based on the provided simulation code data and the provided control software code data provided for each of the one or more electronic control units;
a compiler configured to create an executable program based on the created system model; and
a verification unit configured to perform a software verification process on the basis of the executable program, the software verification process comprising:
  iterating through an execution tree of the executable program according to one or more path conditions of the executable program;
  checking, at each iteration, whether at least one of the one or more verification requirement conditions is fulfilled; and
  notifying a user about the detection of the control error situation in case it is determined that at least one of the one or more verification requirement conditions is fulfilled
wherein performing the software verification process on the basis of the executable program comprises performing symbolic execution on the basis of the system model.

12. Computer program product comprising computer program means storable on a non-transitory computer-readable medium and being executable by a computer device, the program means comprising executable instructions causing the computer device to perform steps of a method according to claim 1.

13. The verification system of claim 11, wherein
creating the executable program based on the created system model comprises transferring one or more parameters of the system model into symbols for symbolic execution.

14. The verification system of claim 13, wherein
providing system input information data that indicates the one or more parameters of the system model to be transferred into symbols for symbolic execution.

15. The verification system of claim 14, wherein
the system model comprises symbolic module code data defining a function for transferring parameters to symbols based on the provided system input information data.

16. The verification system of claim 11, wherein
the system model comprises synchronization module code data indicating synchronization between execution of one or more functions of the control software code data for the one or more electronic control units and the simulation code data for the controlled system.

17. The verification system of claim 16, wherein
the synchronization module code data indicates an executable function which indicates an execution order and execution timing of executable functions of the control software code data for the one or more electronic control units and the simulation code data, enabling different execution frequencies for functions of the control software code data compared to functions of the simulation code data.

18. The verification system of claim 11, wherein the software verification process further comprises:
outputting a specific path condition associated with the detected control error situation.

19. The method for testing control software of a controlled system of claim 1, wherein performing symbolic execution on the basis of the system model comprises:
analyzing program logic corresponding to the verification requirement conditions and generating at least one corresponding symbol;
generating a constraint for the at least one symbol corresponding to a branch of the execution tree; and
determining one or more possible values for the at least one symbol that satisfy the constraint using a symbolic execution constraint solver.

20. The verification system of claim 11, wherein performing symbolic execution on the basis of the system model comprises:
analyzing program logic corresponding to the verification requirement conditions and generating at least one corresponding symbol;
generating a constraint for the at least one symbol corresponding to a branch of the execution tree; and
determining one or more possible values for the at least one symbol that satisfy the constraint using a symbolic execution constraint solver.

* * * * *